April 1, 1969   G. D. SMITH ET AL   3,435,601
MELON LOADER

Filed Nov. 15, 1966   Sheet 1 of 2

GERALD D. SMITH
DAVID G. MARLOW
INVENTORS.
WHANN & McMANIGAL
Attorneys for Applicant

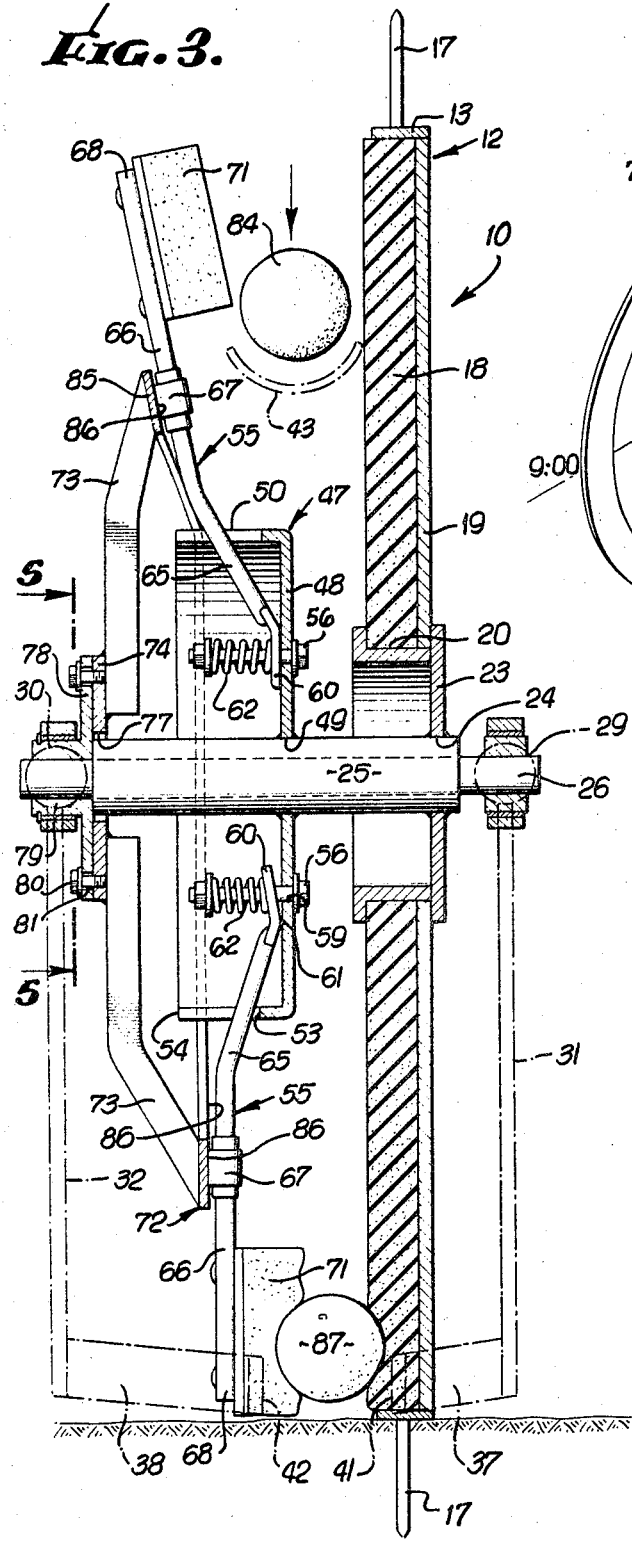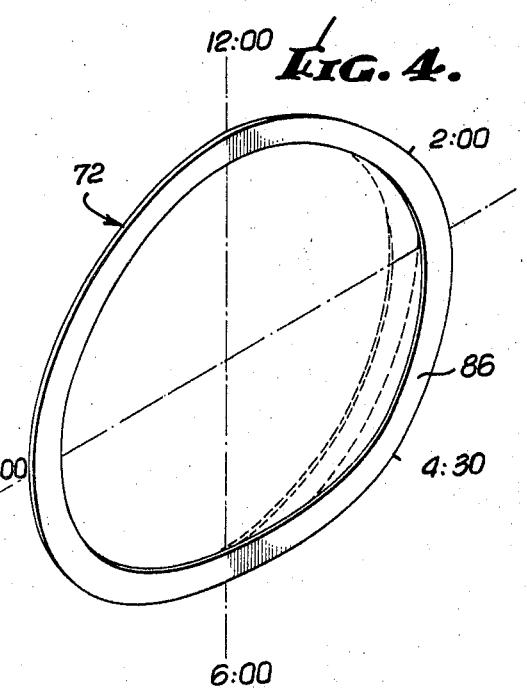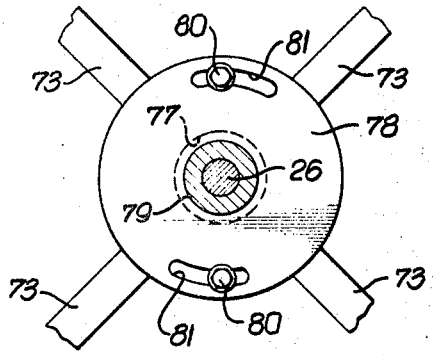

United States Patent Office 3,435,601
Patented Apr. 1, 1969

3,435,601
MELON LOADER
Gerald D. Smith, 943 E. Murphy, and David G. Marlow, Rte. 2, Box 295, both of Blythe, Calif. 92225
Filed Nov. 15, 1966, Ser. No. 594,534
Int. Cl. A01d 45/00
U.S. Cl. 56—327                                10 Claims This invention relates to a device for picking up melons from the soil where they have been growing and for loading them onto a conveyor belt or other receiving means.

The device, according to the invention, is adapted to be connected to the front end of a tractor and moved along the ground, picking up melons as it comes to them, and then discharging them onto a conveyor belt attached to the front end of the device. The conveyor belt is mounted on wheels and attached to the tractor but in front of the melon loader.

It is an object of the invention to provide an improved device for loading melons and other similarly shaped fruits or vegetables from the ground.

It is another object of the invention to provide an efficient and economical melon loader.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 3 is an enlarged partially cross-sectioned view taken as indicated along the line 3—3 in FIG. 2;

FIG. 4 is a perspective view of a cam adapted to determine the melon pickup location and the melon release location; and FIG. 5 is a fragmentary view, illustrating a means for adjusting the cam shown in FIG. 4, and taken as indicated by the line 5—5 in FIG. 3.

Figure 1:
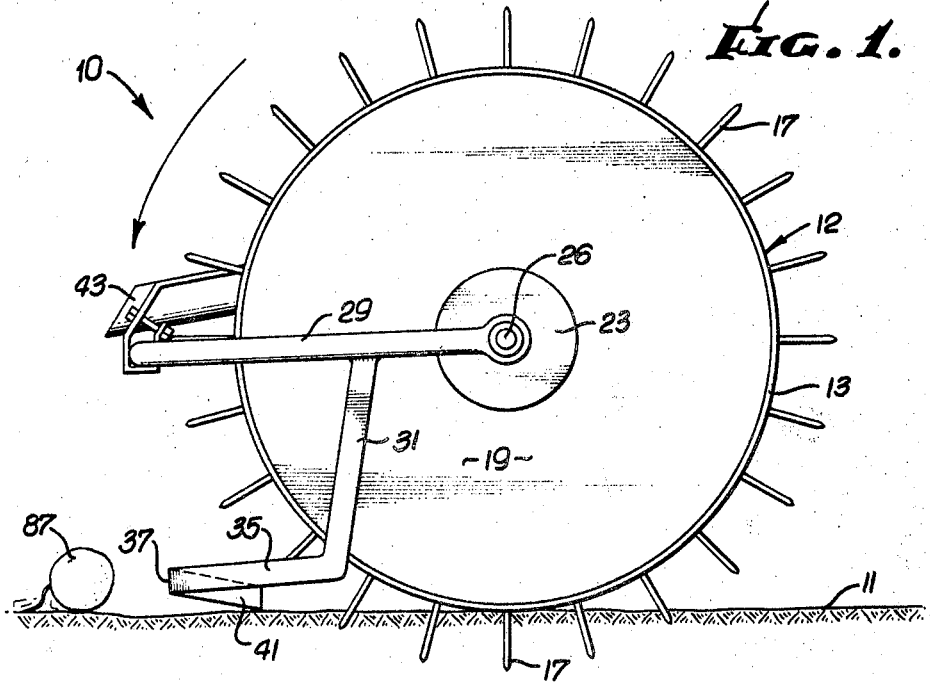
FIG. 1 is a side elevational view of a melon loader according to the present invention, adapted to be moved to the left in the drawing.

Referring again to the drawings, there is shown a melon loader, generally indicated as 10, adapted to move along the soil 11 on a rotatable wheel 12. The wheel has a circumferential band 13 which makes rotational contact with the soil and extending radially outwardly from the band are a multiplicity of circumferentially spaced spikes 17. The spikes extend into the ground and prevent slippage or nonrotational movement of the wheel along the ground.

Inwardly of the band 13 is an annular shaped foam rubber pad 18, secured to an outer annular plate 19. The pad 18 and the plate 19 are fitted into a circumferential groove 20 in an approximately spool-shaped member formed on a disc 23. The disc has a central circular opening 24, through which a hub 25 extends, the hub being welded to the disc. The hub 25 is bearing-mounted for rotation on an axle 26.

The axle extends through openings, adjacent its opposite ends, through two side bars 29 and 30 which form part of a carrier frame. Intermediate the ends of the bars 29 and 30 are depending melon guide members 31 and 32, respectively, on opposite sides of the loader. Each of the guide members has a forward extending member, as 35 and 36, an inwardly extending member, as 37 and 38, shown in FIG. 3, and a rearwardly extending member, as 41 and 42. The inwardly extending members move along the ground so as to support the carrier frame and so as to guide the melons into the device, the melons moving into the device through the members 41 and 42. Supported on and above the side bars 29 and 30 of the carrier frame is a melon chute 43 having an upwardly facing concave surface to receive the melons from the loader and to deliver them to the conveyor.

Figure 2:
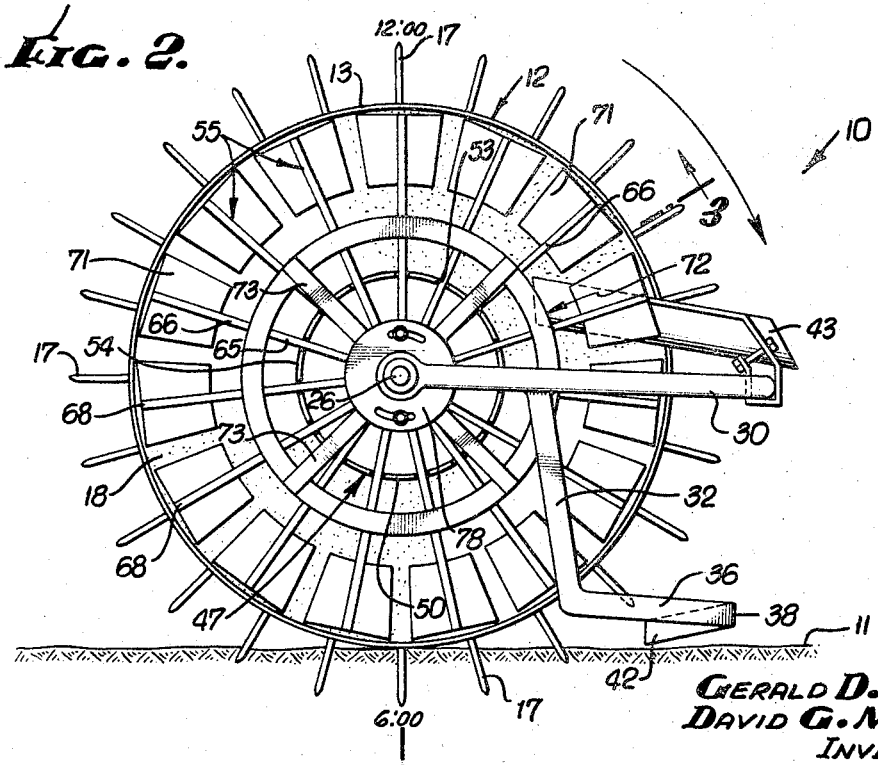
FIG. 2 is an elevational view of the melon loader, illustrating the side opposite that shown in FIG. 1.

Secured to the hub 25 for rotation therewith is a cup-shaped pickup rod carrier 47, as may be best seen in FIGS. 2 and 3. The carrier has a base 48 having a central opening 49 through which the hub extends and at which it is welded to the base. The carrier has a circumferential wall 50 extending axially away from the wheel 12 and it has a plurality of circumferentially spaced, axially directed slots 53 extending axially inwardly from an outer edge 54 of the carrier.

Extending radially outwardly through each of the slots 53 is a pickup rod, each designated generally as 55. Each rod 55 is secured to the carrier by means of a bolt 56 extending through a hole 59 through the base 48. The holes 59 are annularly spaced and are radially inwardly of the respective slots 53. The inner end of each pickup rod is a short lever arm 60, having a fulcrum at 61. As indicated in the upper portion of FIG. 3, the lever arm is adapted to fit flatly against the surface forming the bottom of the cup-shaped carrier 47, and is biased into that position by a coil spring 62 on the bolt 56. Relative to the lever arm 60, as shown on the upper portion of FIG. 3, each pickup rod 55 is formed to extend axially away from the wheel 12. Radially outwardly of the lever arm is a first rod portion 65 and outwardly of that is a second rod portion 66, being bent slightly axially toward the wheel. Secured on the portion 66 is a cylindrical nylon roller bearing 67. At the outer end 68 is secured a pad 71 of the same material as the pad 18. As may be best seen in FIG. 2, the pads 71 are annularly spaced so as to be close enough to each other to prevent a melon from passing between them.

Axially outwardly of the pickup rods 55 is a continuous circular cam or bearing raceway track 72. The cam 72 is supported by four radially directed members 73 and at their inner ends they are secured to a disc 74, having a central opening 77 to space it from the hub 25, as shown in FIG. 3. The disc 74 is secured to a disc 78 having an outwardly directed cylindrical boss 79, which is fixed to the axle 26 and the carrier frame member 30. The disc 74 and the cam 72 are adjustably secured to the disc 78 by means of bolts 80 which extend through slots 81. Thus, it is clear that the cam 72 can be rotated for adjustment to the extent of the length of the slots 81.

The cam 72 is formed and positioned so as to determine the inner or outer axial positions of the pickup rods and more particularly, their pads 71, relative to the pad 18 on the wheel. As may be seen in FIGS. 2, 3 and 4, the cam, between 6:00 and 9:00 and 9:00 and 12:00 o'clock, is flat and relatively close axially to the wheel so as to maintain the pickup rods and their pads in a melon pickup and holding position. As a practical matter, the distance between the inner surfaces of the pads 71 and the pad 18 at the latter positions is about 4". Between the 12:00 and 2:00 o'clock positions the cam is formed away from the wheel in the axial direction so that the pad 71 at the latter position is about 10" from the pad 18 so as to release the melon 84 into the chute 43. In FIG. 3, the upper cross-sectioned end 85 of the cam is about at the 2:00 o'clock position, as indicated by the line 3—3 in FIG. 2. As may be seen in FIG. 4, the cam surface 86 is at its greatest distance from the wheel at about the 4:30 o'clock position, at which point there is an approximate 11" opening between a pad 71 and the pad 18. After the 4:30 o'clock position, the surface 86 of the cam becomes closer to the wheel until the 6:00 position at which it is the closest.

In operation, the loader 10 is connected to the front end of a tractor and also connected to the front end of the tractor, ahead of the loader, is a conveyer belt carried by a wheel mounted support. As the loader is moved along a row, the guide members 41 and 42, as best seen in FIG. 3, guide the melons into the path of the space between the pads 71 and the pad 18. Thus, when a pad 71, rotating downwardly along with the hub 25, the wheel 12 and the pickup rod carrier 47, is moved inwardly axially toward the wheel to a melon pickup location somewhere just forwardly of the 6:00 position, it grips a melon, as 87, between it and the wheel pad 18. The melon is then carried upwardly through the 9:00 o'clock position, the 12:00 o'clock position and finally released somewhere between the 12:00 and 2:00 o'clock positions, depending upon its size, into the melon chute 43 from which it drops onto the conveyer.

The movement of the pickup rods axially inwardly and outwardly relative to the wheel occurs as the result of the axial position of the surface 86 of the cam. As may be seen in FIG. 3, the upper pickup rod and its pad are shown to be in the axially outermost position. In this position, the spring 62 holds the lever arm 60 in substantial full contact with the surface of the base 48, and holds the configuration of the rod portions 65 and 66, such that the bearing 67 makes continuous contact with the cam at the outermost position of the rod, as well as all other axial positions.

At the bottom of FIG. 3, the inner end of the lever arm 60 has been moved away from the base 48 and only the fulcrum 61 is in contact with the latter. The movement of the arm 60 has been against the force of the spring 62 and the movement has occurred as the result of the position of the surface 86 on the cam against the bearing 67. In this position, the pad 71 and the pad 18 firmly grip the melon 87 but without any damage to it. As a pickup rod 55 moves upwardly and past the 12:00 o'clock position, the cam permits it to move axially away from the wheel and the spring 62 causes the lever arm 60 to pivot on its fulcrum, causing the outer end of the pickup rod to move axially away from the wheel, maintaining bearing contact with the cam.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific form shown or uses mentioned except as defined in the accompanying claims, wherein various portions have been separated for clarity of reading and not for emphasis.

We claim:
1. In a melon loader:
   (a) a frame member;
   (b) a wheel mounted for rotation on said frame member;
   (c) pickup means mounted for rotation in spaced axial alignment with said wheel and adapted to be rotated therewith; and
   (d) means mounted on said frame member to move a portion of said pickup means axially with respect to said wheel during rotation from a melon pickup location to a melon release location,
   (e) said pickup means portion being moved axially toward said wheel at said pickup location to hold each melon against said wheel and being moved axially away from said wheel at said release location to permit each melon to drop from the loader.
2. The invention according to claim 1 including: guide means secured to said frame member externally of said wheel and said pickup means to guide melons therebetween at said pickup location.
3. The invention according to claim 1 in which: said pickup means are circumferentially spaced so as to be positioned to hold melons anywhere along a predetermined annular area on said wheel between the pickup location and the release location.
4. The invention according to claim 1 including:
   (a) a melon chute secured to said frame member and positioned to receive melons when released at said release location.
   (b) said chute extending outwardly and downwardly from adjacent said wheel to permit melons to be dropped away from said wheel.
5. The invention according to claim 1 in which:
   (a) said melon pickup means are comprised of a plurality of radially extending members having an inner and an outer end;
   (b) each inner end being secured to a carrier mounted to rotate with said wheel;
   (c) each pickup means being biased axially away from said wheel to have its outer end spaced sufficiently from said wheel to permit a melon therebetween.
6. The invention according to claim 5 in which:
   (a) said means to move said pickup means axially being annular,
   (b) said means to move said pickup means being of varied predetermined axial distances from said wheel and being relatively close to said wheel at said pickup location and relatively remote from said wheel at said release location.
7. The invention according to claim 5 in which:
   (a) said means to move said pickup means axially, when they are rotated, being annular and continuous,
   (b) each of said pickup means having an intermediate portion between its ends in continuous biased and bearing contact with said last means when the pickup means are being rotated.
8. The invention according to claim 7 in which:
   (a) said carrier being cup-shaped having a wall extending from a base,
   (b) said wall having a plurality of axially directed, annularly spaced slots,
   (c) each of said pickup means inwardly of said bearing contact extending in a respective slot and being adapted to move axially therein.
9. The invention according to claim 8 in which:
   (a) each inner end of each pickup means having a lever arm portion adapted to be held in contact with said carrier base by a spring,
   (b) each pickup means radially outwardly of its lever arm extending axially outwardly therefrom,
   (c) said means to move said pickup means axially, during rotation, being a ring-shaped cam spaced axially relatively closely to said wheel at said pickup location and relatively remotely from said wheel at said release location.
10. The invention according to claim 9 wherein:
   (a) each of said pickup means having a melon protective pad on its outer end facing said wheel,
   (b) said wheel having a melon protective pad facing the melon protective pads on said pickup means, the melons being secured between said pads at said pickup location.

References Cited

UNITED STATES PATENTS

| | | | |
|---|---|---|---|
| 831,613 | 9/1906 | Jones | 171—56 XR |
| 2,202,433 | 5/1940 | Schumacher | 171—56 |
| 2,358,872 | 9/1944 | Morris | 171—56 |
| 2,835,098 | 5/1958 | Scheidenblem | 56—327 |
| 2,940,242 | 6/1960 | Patterson | 56—328 |
| 3,057,143 | 10/1962 | Bratun | 56—327 XR |
| 3,331,197 | 7/1967 | O'Brien | 56—327 |
| 3,380,234 | 4/1968 | Garrett | 56—327 |

RUSSELL R. KINSEY, *Primary Examiner.*